Dec. 19, 1939.  J. H. COLEMAN  2,183,765
SPHERICAL TRIANGLE MEASURING INSTRUMENT
Filed Dec. 6, 1938    2 Sheets-Sheet 1

Inventor
J. H. Coleman
By Mason Fenwick & Lawrence
Attorneys

Dec. 19, 1939.    J. H. COLEMAN    2,183,765
SPHERICAL TRIANGLE MEASURING INSTRUMENT
Filed Dec. 6, 1938    2 Sheets-Sheet 2
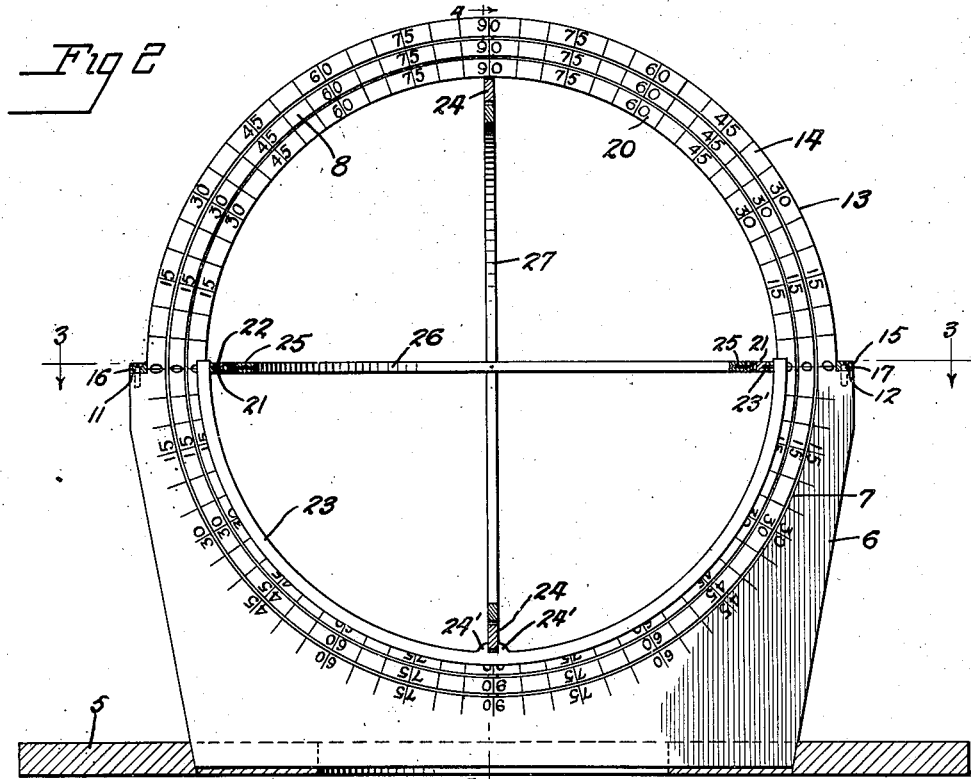
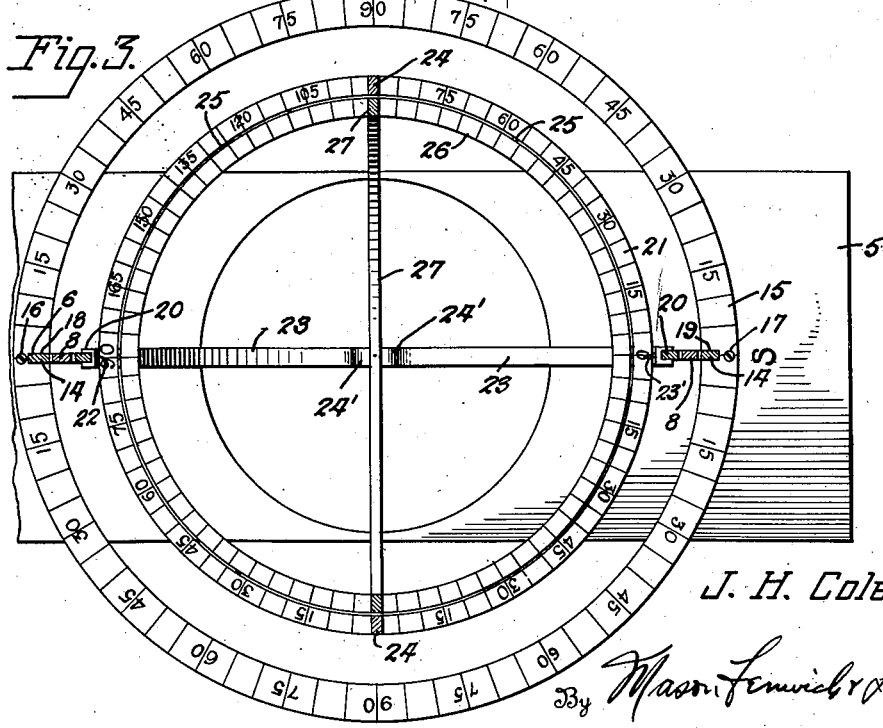
Inventor
J. H. Coleman
By Mason, Fenwick & Lawrence
Attorneys Patented Dec. 19, 1939

2,183,765

UNITED STATES PATENT OFFICE 2,183,765

SPHERICAL TRIANGLE MEASURING INSTRUMENT

John H. Coleman, Asheville, N. C.

Application December 6, 1938, Serial No. 244,252

6 Claims. (Cl. 33—1)

This invention relates generally to mechanical measuring devices; and, more particularly to devices of this class for mechanically setting up and solving problems in spherical trigonometry.

The main object of the invention is to provide a device of this character by means of which any three parts of a spherical triangle may be physically reproduced and represented by relative setting of corresponding parts of the instrument, and the whole spherical triangle mechanically solved by the relative positioning of the other parts of the instrument incident to such setting.

A further object of the invention is to provide an instrument of the character referred to which may have its parts adjusted to show the true relation between right ascension and declination, versus celestial longitude and latitude and to trace or solve cometary or planetary orbits.

Still another object of the invention is to provide an instrument of this type by which the right ascension, declination, celestial longitude and latitude of a planet may be set up and measured for any part of its orbit when given its inclination to the ecliptic and the longitude of its node.

Another object of the invention is to provide a device of this character in which all the circles are complete so that measurements made are automatically verified 180° away, and the readings may be conveniently determined from either side of the instrument.

Other objects of the invention will become apparent as the detailed description thereof proceeds:

In the drawings:

Figure 2 is a central, vertical section taken through the instrument with the various circles thereof arranged in convenient position to illustrate the construction of the instrument and the graduations of the several parts thereof;

Figure 3 is a horizontal section taken on the line 3—3 of Figure 2; and

Figure 1:
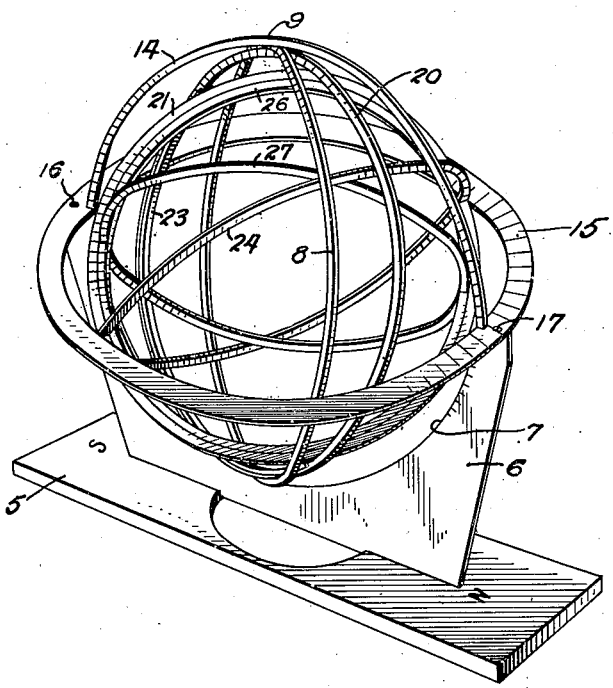
Figure 1 is a perspective view of the spherical, triangle measuring instrument embodying the present invention.

The instrument comprises a base 5 with indications for a compass needle pit and levels, the compass needle box being removable, setting in and supported by the rim of the circle for the present indicated office or practical use, or if desired the whole instrument, with the needle box lifted out may be attached by means of threads on the inside of this base circle 5 to other threads on the outside of a plain sightless compass box in the same manner that a transit is screwed to its tripod. A meridian plate 6, suitably secured to the base 5 to extend perpendicularly thereto forms a support for the whole instrument and receives the altitude-zenith distance circle 8, which is provided with slit sight vanes and is mounted to rotate about the pivot pins 9 and 10 having their common axis coincident with the diameter of the aperture 7 perpendicular to the base plate 5.

The meridian plate 6 is cut to form shoulders 11 and 12 aligned with each other slightly below and parallel to the diameter of the aperture 7 which is parallel to the base 5. That part of the meridian plate 6 lying above the shoulders 11 and 12 is cut to form a circular periphery 13 concentric with that of the aperture 7, thereby forming a semi-annular continuation of the lower part of the meridian plate 6.

A horizon-azimuth-right ascension circle 15 is seated on the shoulders 11 and 12 and is suitably secured thereto by means of the machine screws 16 and 17 which are threaded into tapped bores in the meridian plate 6. This azimuth circle 15 is provided at diametrically opposite parts with notches 18 and 19 which fit snugly over the upper part 14 of the meridian plate 6, so that the inner periphery of the circle 15 lies flush with the inner periphery of the aperture 7. This detachable connection between the circle 15 and the meridian plate enables the azimuth circle 15 to be reversed for a purpose to be described hereinafter.

A latitude-colatitude circle 20 fits snugly within the altitude-zenith distance circle 8, and is pivoted to rotate about the pivot pins 9 and 10. A declination-hour angle circle 21 is pivoted to rotate about diametrically opposite pivot pins 22 and 23' projecting inwardly toward each other from the opposite ends of a semi-circular supporting member 23, which is U-shaped in cross section and fits snugly and slidably over the inner edge of the circle 20. The circle 21 is suitably secured at diametrically opposite points to a celestial longitude-hour angle measure circle 24, so that this circle 24 partakes of the pivotal movements of the circle 21 about the axis of the pivot pins 22 and 23. Lugs 24' are formed on the U-shaped member 23 to engage opposite sides of the circle 24 slidably to maintain the said circle center on the U-shaped member.

The inner edge of the circle 21 is grooved to receive slidably a series of pins 25 spaced angularly around a location circle 26 which is always maintained by this construction, coplanar with the circle 21. A parallactic angle circle 27 is suitably secured to diametrically opposite points of the location circle 26 and has its outer periphery snugly fitting the inner periphery circle 24. The location circle, therefore, constitutes in effect a pivot by means of which the circle 27 may pivot about an axis perpendicular to the common axis of the pivot pins 22 and 23 which support the declination-hour angle circle 21.

As shown in Figure 3 of the drawings, the circle 15 is graduated on one side in degrees, increasing from zero at the north and south points to 90° at the east and west points. In this position, the circle 15 is used for measuring horizon or azimuth. The other side of the circle 15 has its graduations increasing from zero to 360°, with the zero graduation starting at the west point and increasing around the south, east and north points to 360°, which is coincident with the zero graduation. When this circle 15 is reversed end-for-end on the shoulders 11 and 12, it becomes a right ascension circle.

The altitude-zenith distance circle 8 always stands in the zenith and is bisected by the horizon circle 15. The circle 8 is graduated on one side, as shown in Figure 2, from the horizon up to the zenith and down to the nadir points for altitude, the graduations increasing in opposite directions from zero at the horizon to 90° at the zenith and nadir points. On the other side, this circle 8 is graduated in degrees from zero at the zenith and nadir points increasing in opposite direction to 90° at the horizon for zenith distance, thereby providing complementary values for altitude and zenith distances.

The latitude-colatitude circle 20 is graduated on its opposite sides exactly like the circle 8, and exactly like the scales formed around the circular aperture 7 on the meridian plate 6 which has been graduated and numbered merely for convenience.

The declination-hour angle circle 21 is provided on the east side with graduations starting from zero graduation and increasing in opposite directions to 90° at the opposite ends of the pivot pins 22 and 23, the common axis of which is the axis for declination. On the opposite or west side of this axis, the circle 21 is provided with a scale graduated in degrees with zero at the south point and increasing through 90° on the west point to 180° at the north. The numbers on this scale represent the north polar distances. Thus, when the circle 8 is set at a given point on the east side, as 30° north declination, the scale on the other side of the circle 21 will read 60°; that is, the north polar distance. The revolution of this hour angle circle around its axis 22—23 determines the hour angle and is read on the circle 24 to the meridian point under the circle 20.

Figure 4:
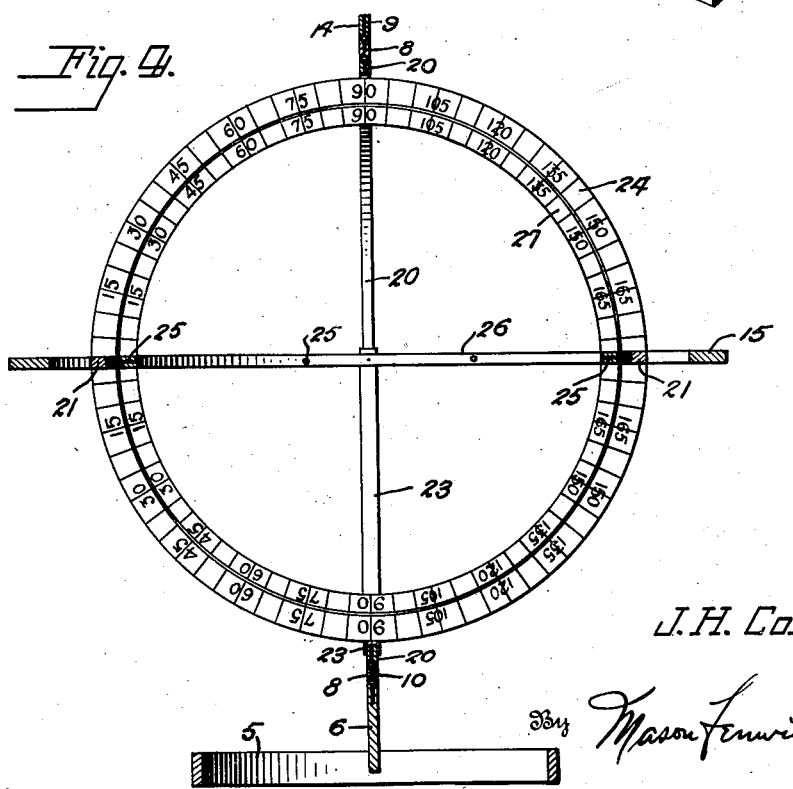
Figure 4 is a vertical section taken on the line 4—4 of Figure 2.

The celestial longitude-hour angle measure circle 24 is graduated, as shown in Figure 4, for celestial longitude from zero at the west point, around the upper part of the circle, to 180° at the east point; and, from the east point from zero around the lower part of the circle to 180° at the west point. The other side of this circle 24 is graduated through 360° with the zero graduation directly in line with the zero on the first named side. The hour-angle is measured from the hour-angle circle 21 to the zenith, and its value is read on the circle 24 where it passes the meridian. The degrees or hours are measured from the nadir (at midnight) up through the east point to the zenith for A. M. time and beyond it for P. M. time. On this principle, the celestial longitude beings 90° west of the zenith for zero hour angle. Either of these notations measures the angle at the common axis of the pivots 22—23, either from the west point to the position of the circle 21, or from the zenith to that circle.

The location circle 26 slides around the circle 20, transits the hour angle circle 21, and is marked with zero graduations only on diametrically opposite sides to stand at the intersection of the circles 8 and 21.

The parallactic angle circle 27 is fixed perpendicularly to the location circle 26 and bisects the diameter through the zero points thereof. This circle 27 is graduated from zero to 180° around its upper half, with similar graduations extending around the lower half and having its zero coincident with the 180° graduation on the upper half. These scales measure the parallactic angle when the zero of the circle 26 stands at the intersection of the circles 8 and 21.

In the specification and claims, the word "circle" is used for convenience to identify the various annular plates which are connected together to form a physical embodiment of this invention. It is intended that the movable parts of the invention shall be so constructed as to maintain any position to which they may be adjusted by friction between the parts. It is to be understood, however, that suitable clamps may be arranged to clamp such parts in relatively adjusted position whenever found desirable. The various clamps and other devices of this character which might be used in the instrument have been omitted to illustrate the principles of the invention clearly.

What I claim is:

1. A mechanical calculator comprising a base, a meridian plate extending perpendicularly from one side of said base and provided with a circular aperture and having shoulders substantially in alignment with the diameter of said aperture parallel to said base, a first combined azimuth and right ascension circle seated on said shoulders and having its inner edge substantially flush with the edge of said aperture, said first circle being reversible end-for-end on said shoulders, and a second circle pivoted to rotate on said meridian plate within said aperture about a diameter perpendicular to the plane of said first circle, said second circle being graduated for altitudes and zenith distances.

2. A mechanical calculator comprising a base, a meridian plate extending perpendicularly from one side of said base and provided with a circular aperture and having shoulders substantially in alignment with the diameter of said aperture parallel to said base, a first combined azimuth and right ascension circle seated on said shoulders and having its inner edge substantially flush with the edge of said aperture, said first circle being reversible end-for-end on said shoulders and a second circle pivoted to rotate on said meridian plate within said aperture about a diameter perpendicular to the plane of said first circle, said second circle being graduated for altitudes and zenith distances, and means for detachably securing the said first circle in seated position on said shoulders.

3. A mechanical calculator comprising a base, a meridian plate extending perpendicularly from one side of said base and provided with a circular aperture and having shoulders substantially in alignment with the diameter of said aperture parallel to said base, a first combined azimuth and right ascension circle seated on said shoulders and having its inner edge substantially flush with the edge of said aperture, said first circle being reversible end-for-end on said shoulders, and a second circle pivoted to rotate on said meridian plate within said aperture about a diameter perpendicular to the plane of said first circle, said second circle being graduated for altitudes and zenith distances, a third circle having its outer periphery slightly less than the inner periphery of the second circle, said third circle being pivoted to rotate about the same diameter as the second circle and being provided with graduations for indicating latitude and colatitude.

4. A mechanical calculator comprising a base, a meridian plate extending perpendicularly from one side of said base and provided with a circular aperture and having shoulders substantially in alignment with the diameter of said aperture parallel to said base, a first combined azimuth and right ascension circle seated on said shoulders and having its inner edge substantially flush with the edge of said aperture, said first circle being reversible end-for-end on said shoulders, and a second circle pivoted to rotate on said meridian plate within said aperture about a diameter perpendicular to the plane of said first circle, said second circle being graduated for altitudes and zenith distances, a third circle having its outer periphery slightly less than the inner periphery of the second circle, said third circle being pivoted to rotate about the same diameter as the second circle and being provided with graduations for indicating latitude and colatitude, a semi-circular slide U-shaped in cross section mounted to embrace and slide along the inner edge of the third circle, and a fourth circle pivoted to the opposite ends of said slide to rotate transversely within said third circle, said fourth circle being graduated to indicate declination and hour angle.

5. A mechanical calculator comprising a base, a meridian plate extending perpendicularly from one side of said base and provided with a circular aperture and having shoulders substantially in alignment with the diameter of said aperture parallel to said base, a first combined azimuth and right ascension circle seated on said shoulders and having its inner edge substantially flush with the edge of said aperture, said first circle being reversible end-for-end on said shoulders, and a second circle pivoted to rotate on said meridian plate within said aperture about a diameter perpendicular to the plane of said first circle, said second circle being graduated to indicate altitudes and zenith distances, a third circle having its outer periphery slightly less than the inner periphery of the second circle, said third circle being pivoted to rotate about the same diameter as the second circle and being provided with graduations for indicating latitude and colatitude, a semi-circular slide U-shaped in cross section mounted to embrace and slide along the inner edge of the third circle, and a fourth circle pivoted to the opposite ends of said slide to rotate transversely within said third circle, said fourth circle being graduated to indicate declination and hour angle, a fifth circle fixed perpendicularly to the fourth circle at points passing through a diameter at right angles to the pivot axis of said fourth circle, said fifth circle being graduated on opposite sides to indicate celestial longitudes and hour angle measures.

6. A mechanical calculator comprising a base, a meridian plate extending perpendicularly from one side of said base and provided with a circular aperture and having shoulders substantially in alignment with the diameter of said aperture parallel to said base, a first combined azimuth and right ascension circle seated on said shoulders and having its inner edge substantially flush with the edge of said aperture, said first circle being reversible end-for-end on said shoulders, and a second circle pivoted to rotate on said meridian plate within said aperture about a diameter perpendicular to the plane of said first circle, said second circle being graduated to indicate altitudes and zenith distances, a third circle having its outer periphery slightly less than the inner periphery of the second circle, said third circle being pivoted to rotate about the same diameter as the second circle and being provided with graduations for indicating latitude and colatitude, a semi-circular slide U-shaped in cross section mounted to embrace and slide along the inner edge of the third circle, and a fourth circle pivoted to the opposite ends of said slide to rotate transversely within said third circle, said fourth circle being graduated to indicate declination and hour angle, a fifth circle fixed perpendicularly to the fourth circle at points passing through a diameter at right angles to the pivot axis of said fourth circle, said fifth circle being graduated to indicate celestial longitudes and hour angle measures, a sixth circle and means for mounting said sixth circle to rotate within said fifth circle and about a diameter perpendicular to the plane of said fifth circle, said sixth circle being graduated to indicate parallactic angles.

JOHN H. COLEMAN.